July 3, 1951  J. E. B. SHAW  2,558,987
BLOOD TRANSFUSION FILTER UNIT
Filed Nov. 6, 1948
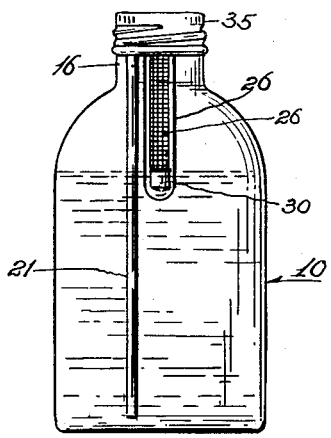
Fig. 1.
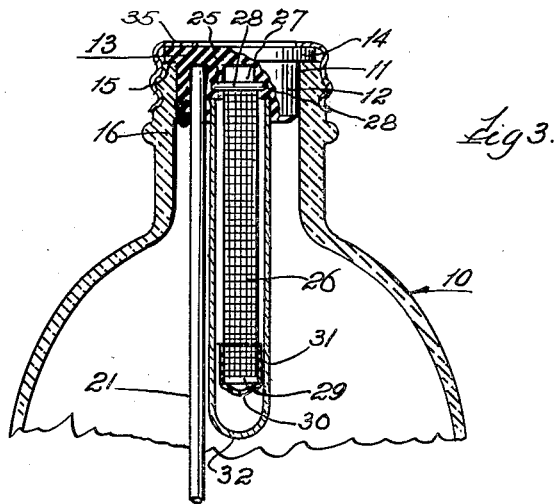
Fig. 3.
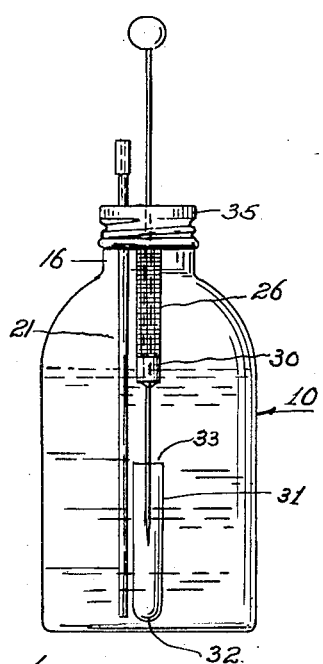
Fig. 2.
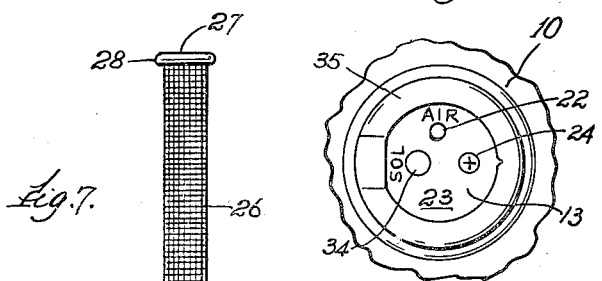
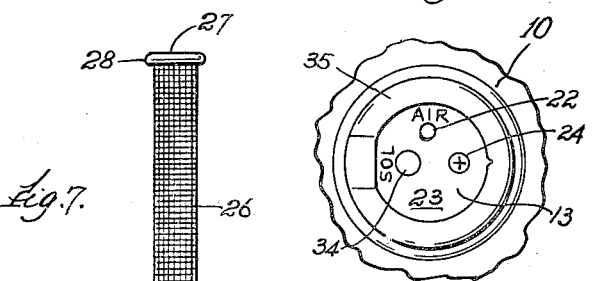
Fig. 7. Fig. 4. Fig. 8. Fig. 5. Fig. 6.
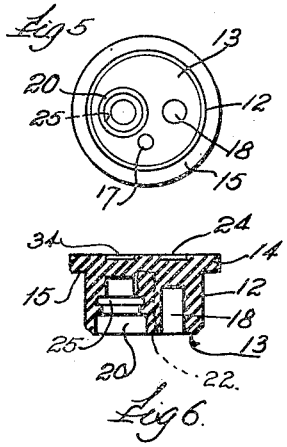
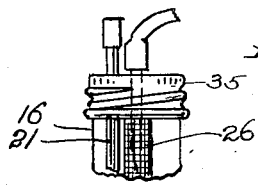
Fig. 9.
Inventor.
John E. B. Shaw.
by McKnight and Comstock
Attorneys Patented July 3, 1951

2,558,987

UNITED STATES PATENT OFFICE 2,558,987

BLOOD TRANSFUSION FILTER UNIT

John E. B. Shaw, Chicago, Ill.

Application November 6, 1948, Serial No. 58,687

3 Claims. (Cl. 128—214)

My invention relates to a blood transfusion apparatus.

Among the objects of my invention is to provide a filter unit for blood transfusions in which the filtering is done within the container prior to the blood leaving the same, and which filter is protected from corrosion.

It is desirable to filter the blood while it is still in the container, and before it enters the tube line. There is greater likelihood of the blood clogging in the narrow tube line, where the clogging cannot be dislodged by shaking.

It is also desirable to have the filter built into the container so that the filtering will be sterile, immediate and uniform. Time is saved by an attendant searching for a suitable filtration apparatus and sterilizing and fitting the same. My unit provides for efficiency and economy.

Since sodium citrate or the like is placed in the container as an anti-coagulant to prevent clotting of the blood, and as sodium citrate and the like have an extremely corrosive effect on the metal mesh of blood filters, I provide a protective cover of glass or other like corrosive resistant material for my blood filter to protect the same, and means for removing the cover immediately prior to use of the container for a blood transfusion, without removing the sealing plug from the container.

My invention also contemplates such other objects, advantages and capabilities as will later more fully appear and which are inherently possessed by my invention.

While I have shown in the accompanying drawing a preferred form of my invention, yet I wish it understood that the same is susceptible of modification and change without departing from the spirit of my invention.

Referring to the drawing, Fig. 1 is an elevational view of my bottle filled; Fig. 2 is an elevational view of my bottle with the cover of the filter being removed; Fig. 3 is an enlarged detailed sectional view of the filter and bottle construction; Fig. 4 is a top plan view of the bottle top with the plug is position; Fig. 5 is a bottom view of the plug; Fig. 6 is a detailed sectional view of the plug; Fig. 7 is an elevational view of the filter; Fig. 8 is an elevational view of the cover and Fig. 9 is a detailed view of the top of the construction when in use.

The embodiment selected to illustrate my invention comprises a bottle 10 formed of glass or any other suitable material, having an open mouth 11.

Extending within the open mouth 11 is the body portion 12 of a plug 13 of pierceable rubber or the like. A flange 14 at the upper part of the body portion 12 provides a rim 15 which rests on top of the walls 16 of the bottle 10 surrounding the mouth 11.

Three spaced openings 17, 18 and 20 extend upwardly from the bottom of the body portion 12, but end short of extending therethrough. The smallest of the openings 17 receives and holds by friction grip the upper end of air tube 21, preferably made of glass. A slight depression 22 marked Air is positioned in the top 23 of plug 12 on a line with opening 17 and is adapted to receive a needle, which when forced through plug 13 provides air for air tube 21.

The next larger opening 18 is directly below an indication 24, preferably a circle containing an X marked in top 23 to direct a needle which when passed through plug 13 extends into opening 18 to permit blood and anti-coagulant such as sodium citrate, or other liquid to be passed into container 10. When the needle is withdrawn, plug 13 is substantially self sealing.

The largest opening 20 has at its upper end a transverse radial opening 25.

A blood filter 26 formed of fine metal mesh is preferably cylindrical in form, and has an open upper end 27 with a slight outturned flange 28. The open upper end 27 of filter 26 is removably positioned within opening 20, and flange 28 fits within transverse radial opening 25. The bottom open end 29 of filter 26 is closed by pierceable cap 30 formed of rubber or the like.

A cover 31 of glass, or other suitable material resistant to sodium citrate or the like, having a closed bottom 32 and an open top 33, removably and spacedly covers filter 26, with its upper portion extending into opening 20 and held therein by friction grip with the walls of the plug 13 surrounding opening 20, and its upper end contacting the walls of the plug below transverse radial opening 25.

In top 23 of plug 13 is a depression 34 positioned immediately above opening 20 and marked Sol.

A cap 35 is screw threaded to the neck of the container.

When a blood transfusion is to be given, a stylet or other instrument having a sharp point is placed in depression 34 and forced through plug 13 into the open top 27 of filter 26, and down through pierceable bottom cap 30 and against the closed bottom 32 of cover 31. Cover 31 is moved downwardly by the stylet and forced out of opening 20 into the liquid in container 10 where it drifts to the bottom of the container. Filter 26 is then free to act as a filter. When the stylet is withdrawn, the opening caused thereby in cap 30 substantially closes due to the inherent qualities of the material of which it is made.

A needle is placed in depression 22 and forced through plug 13 into air tube 21 for providing air. Another needle is placed in depression 34, forced through plug 13 into the open top of filter 26 to receive the flow of blood from the container 10 when the same is inverted.

Having thus described my invention, I claim:

1. A blood transfusion unit comprising a container adapted to hold blood and an anti-coagulant corrosive to metal, said container having an opening, a pierceable plug removably closing said opening, said plug having an opening in its bottom portion, a filter of metal mesh having an open upper end extending within the opening in said plug and removably held therein within said container, a pierceable self-sealing rubber cap attached to and closing the lower end of said filter, a cover of material substantially resistant to the corrosive effect of the anti-coagulant, said cover having an open upper end and a lower closed end, said cover spacedly covering said filter and having its upper end extending within the opening in said plug and removably held therein, said plug adapted to be pierced immediately above said filter by a stylet, said filter adapted to receive the stylet, said self-sealing rubber cap on said filter adapted to be pierced by the stylet, and the closed bottom end of said cover spaced below said self-sealing rubber cap adapted to be engaged by the stylet for forcing the cover out of the opening in said plug for exposing said filter, said plug adapted to be pierced by an air supply member, said self-sealing rubber cap sealing itself upon withdrawal of the stylet, said plug also adapted upon withdrawal of the stylet to be pierced by a liquid flow member extending into said filter, so that blood in said container will be filtered by said filter before leaving said container and passing into the liquid flow member.

2. A blood transfusion unit comprising a container adapted to hold blood, said container having an opening, a pierceable plug removably closing said opening, said plug having an opening in its bottom portion, a filter having an open upper end extending within the opening in said plug and removably held therein within said container, a self-sealing rubber pierceable cap attached to and closing the lower end of said filter, said plug adapted to be pierced immediately above said filter by a stylet, said filter adapted to receive the stylet, said cap on said filter adapted to be pierced by the stylet, said plug adapted to be pierced by an air supply member, said plug also adapted upon withdrawal of the stylet to be pierced by a liquid flow member extending into said filter, so that blood in said container will be filtered by said filter before leaving said container and passing into the liquid flow member.

3. A blood transfusion filter unit comprising a container adapted to hold blood and an anti-coagulant corrosive to metal and having an opening, a plug removably closing said opening, a filter of metal mesh attached to said plug within said container, said filter having a self-sealing rubber bottom, a cover of material substantially resistant to the corrosive effect of the anti-coagulant, said cover removably attached to said plug within said container, and spacedly covering said filter, said plug adapted to be pierced by an air supply member, said plug also adapted to be pierced first by a stylet to remove said cover from said filter and then by a liquid flow member extending into said filter, so that blood in said container will be filtered by said filter before leaving said container and passing into the liquid flow member said self-sealing rubber bottom of said filter adapted to be pierced by the stylet to permit removal of the cover and to seal itself after removal of the stylet.

JOHN E. B. SHAW.

REFERENCES CITED

The following references are of record in the file of this patent:

UNITED STATES PATENTS

| Number | Name | Date |
| --- | --- | --- |
| 2,156,313 | Schwab | May 2, 1939 |
| 2,231,418 | Trotter | Feb. 11, 1941 |
| 2,276,421 | Ross | Mar. 17, 1942 |
| 2,393,578 | Waite | Jan. 22, 1946 |
| 2,464,496 | Gee | Mar. 15, 1949 |